(12) United States Patent
Jung et al.

(10) Patent No.: US 8,120,722 B2
(45) Date of Patent: Feb. 21, 2012

(54) DISPLAY DEVICE WITH A BOTTOM CHASSIS

(75) Inventors: Jai Sang Jung, Ulsan-si (KR); Aoki Toshihiro, Suwon-si (KR); Sung Ku Kang, Suwon-si (KR); Dong Soo Son, Suwon-si (KR); Seo Hee Ha, Suwon-si (KR); Jong Su Lee, Suwon-si (KR); Youn Hwan Jung, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 241 days.

(21) Appl. No.: 12/007,545

(22) Filed: Jan. 11, 2008

(65) Prior Publication Data

US 2008/0170170 A1    Jul. 17, 2008

(30) Foreign Application Priority Data

Jan. 17, 2007   (KR) .................. 10-2007-0005321
Feb. 7, 2007    (KR) .................. 10-2007-0012868

(51) Int. Cl.
*G02F 1/1333*        (2006.01)
(52) U.S. Cl. ........................................... 349/58
(58) Field of Classification Search .................. None
See application file for complete search history.

(56) References Cited

U.S. PATENT DOCUMENTS

| | | | |
|---|---|---|---|
| 4,714,983 A * | 12/1987 | Lang | 362/27 |
| 6,016,175 A * | 1/2000 | Kim | 349/58 |
| 6,392,724 B2 * | 5/2002 | An et al. | 349/58 |
| 6,626,550 B2 | 9/2003 | Choi | |
| 6,942,374 B2 * | 9/2005 | Lee | 362/615 |
| 7,583,556 B2 * | 9/2009 | Zhu | 365/226 |
| 2003/0223249 A1 * | 12/2003 | Lee et al. | 362/561 |
| 2005/0001952 A1 * | 1/2005 | Han et al. | 349/65 |
| 2005/0068473 A1 * | 3/2005 | Kim et al. | 349/65 |
| 2006/0187679 A1 * | 8/2006 | Cha et al. | 362/633 |
| 2007/0035842 A1 * | 2/2007 | Suh et al. | 359/599 |
| 2007/0121024 A1 * | 5/2007 | Lim et al. | 349/58 |
| 2007/0126335 A1 * | 6/2007 | You et al. | 313/485 |

FOREIGN PATENT DOCUMENTS

| | | |
|---|---|---|
| CN | 1 885 072 A | 12/2006 |
| JP | 05-008542 U | 2/1993 |
| JP | 10-214047 A | 8/1998 |
| JP | 2004-347957 A | 12/2004 |
| JP | 2005-227720 A | 8/2005 |
| JP | 2005-0367791 | 12/2005 |
| JP | 2006-235438 | 9/2006 |
| JP | 2007-005309 | 1/2007 |
| KR | 10-2001-0065164 A | 7/2001 |
| KR | 10-2002-0029709 A | 4/2002 |
| KR | 10-2004-0049202 A | 6/2004 |
| KR | 10-2004-0097092 | 11/2004 |
| KR | 10-2006-0088346 A | 8/2006 |
| KR | 10-2006-0093956 | 8/2006 |
| KR | 10-2006-0104433 A | 10/2006 |
| KR | 10-2006-0134539 A | 12/2006 |
| WO | WO 2007/034786 A1 | 3/2007 |

* cited by examiner

*Primary Examiner* — Thanh-Nhan Nguyen
(74) *Attorney, Agent, or Firm* — Lee & Morse, P.C.

(57) ABSTRACT

A display device may include a display panel, at least one optical sheet on the display panel, a light guide plate on the at least one optical sheet, and a bottom chassis having a side surface part on which the display panel is seated, an inner side part having at least one step from the side surface part, the at least one optical sheet and the light guide plate being in the inner side part.

20 Claims, 6 Drawing Sheets

DISPLAY DEVICE WITH A BOTTOM CHASSIS

BACKGROUND OF THE INVENTION

1. Field of the Invention

Embodiments relate to a display device. More particularly, embodiments pertain to a display device capable having a reduced manufacturing cost.

2. Description of the Related Art

Various flat panel display devices may be capable of reducing weight and volume, which are the disadvantages associated with cathode ray tubes. The flat panel display devices may be classified into, e.g., liquid crystal displays (LCDs), field emission displays (FEDs), plasma display panels (PDPs), organic light emitting diode (OLED) displays, etc.

Among the various displays, LCDs may be advantageous in terms of miniaturization, light weight, low power consumption, etc. LCDs have gradually been regarded as an alternative route to overcome the disadvantages of the cathode ray tubes. Today, LCDs have been provided in, e.g., cellular phones, personal digital assistants (PDAs), monitors, TVs, etc.

In the LCDs, a backlight assembly may be provided with numerous components. Accordingly, there has been a problem that the manufacturing cost of the LCD device is increased due to the numerous components.

SUMMARY OF THE INVENTION

Embodiments are therefore directed to a display device which substantially overcomes one or more problems due to the limitations and disadvantages of the related art.

It is therefore a feature of an embodiment to provide a display device capable of having a reduced manufacturing cost.

It is therefore another feature of an embodiment to provide a display device having fewer parts.

At least one of the above and other features and advantages of the embodiments may be realized by providing a display device that may include a display panel, at least one optical sheet on the display panel, a light guide plate on the at least one optical sheet, and a bottom chassis having a side surface part on which the display panel is seated, and an inner side part having at least one step from the side surface part, the at least one optical sheet and the light guide plate being in the inner side part.

A projecting part may extend from an outer side of the side surface part. The projecting part may extend at a substantially right angle from the side surface part, and the projecting part is bent back toward the outer side of the side surface part. LEDs may be on a LED substrate. The LED substrate may be in the inner side part. The display panel may be fixed to the side surface part by an adhesive material. The adhesive material may be adhesive tape. The display device may further include a reflector between the inner side part and the light guide plate. The display device may further include a top chassis on the display panel, the top chassis being fixed to the bottom chassis. The light guide plate may include first holes adapted to accommodate LEDs, and second holes adapted to accommodate components of a flexible printed circuit. The bottom chassis may include an opening part over the first holes and the second holes.

An outer side of the light guide plate may have at least one step part proceeding from the outer side to an inner side of the light guide plate. The step parts may be opposite to each other on both sides of the light guide plate. The step parts may be on all side surfaces of the light guide plate in a quadrangular form. The display device may further include a reflector between the inner side part and the light guide plate.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
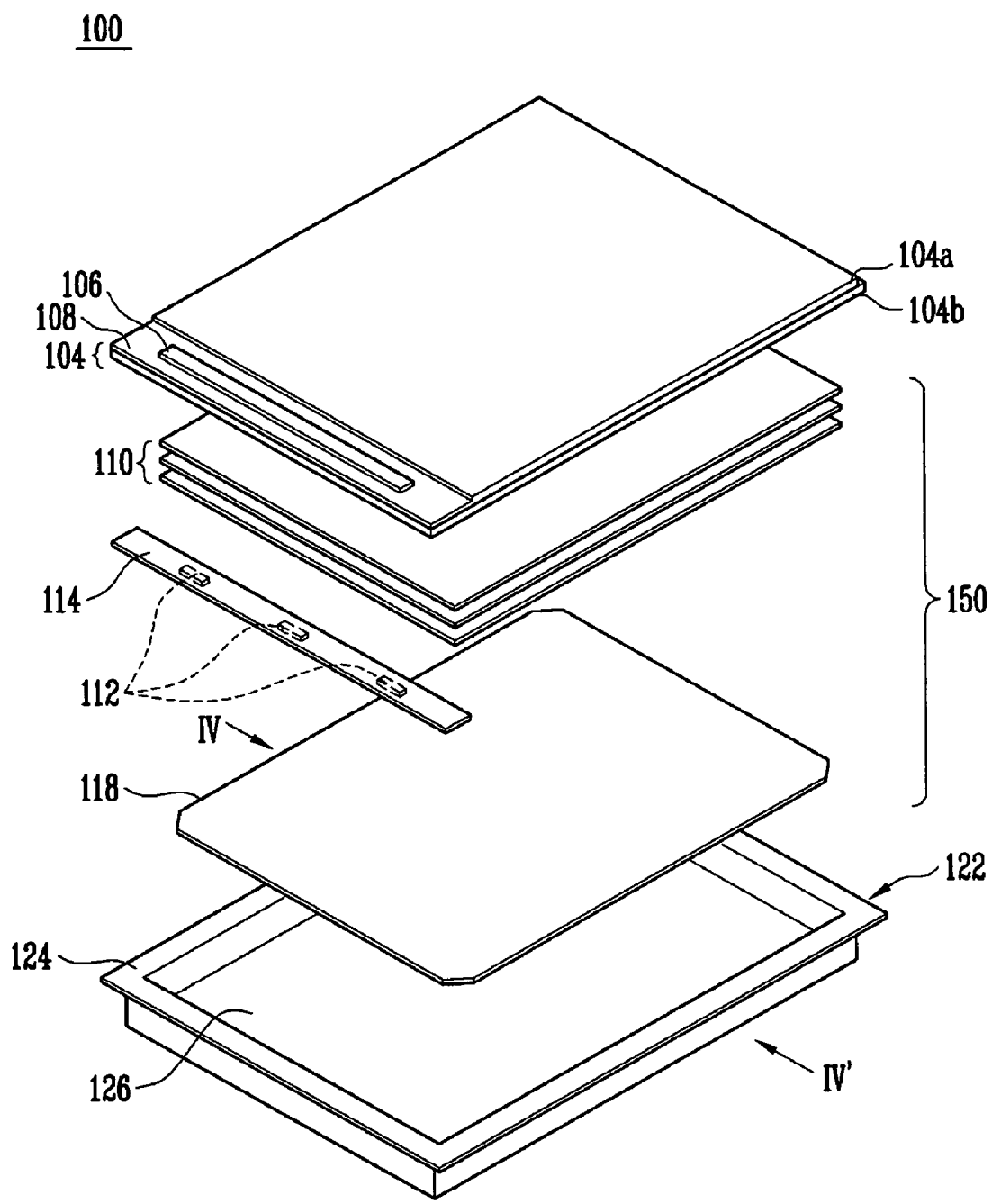
FIG. 1 illustrates an exploded perspective view of a LCD device according to a first embodiment.

Korean Patent Application Nos. 2007-0005321, filed on Jan. 17, 2007, and 2007-0012868, filed on Feb. 7, 2007, in the Korean Intellectual Property Office, and entitled: "Liquid Crystal Display Device," are incorporated by reference herein in their entireties.

Embodiments will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A display device according to embodiments may have a light guide plate and optical sheets inserted into a bottom chassis so that a mold frame may be removed, making it possible to reduce the manufacturing cost. The bottom chassis may be aluminum, and the light guide plate and the optical sheets may be inserted in the bottom chassis, which thus may make it possible to impart higher strength. The light guide plate may be formed with a step part, which may make it possible to prevent the movement of the optical sheets.

Although the exemplary embodiments are drawn to a LCD device, the embodiments may be employed for any passive display device requiring light from an external source.

FIG. 1 illustrates a view of a LCD device 100 according to a first embodiment.

Referring to FIG. 1, the LCD device 100 may include a LCD panel 104, a backlight assembly 150, and a bottom chassis (or a bezel) 122.

The LCD panel 104 may display a predetermined image. The LCD panel 104 may include a first substrate 104a, a second substrate 104b, and a liquid crystal (not shown) injected between the first substrate 104a and the second substrate 104b.

The second substrate 104b may include multiple TFTs arranged in an array. A source electrode of each TFT may be connected to a data line, and a gate electrode thereof may be connected to a scan line. A drain electrode of the TFT may be connected to a pixel electrode of transparent conductive materials, e.g., ITO, indium zinc oxide (IZO), etc. The TFT may be turned-on when a scan signal is supplied to the scan line so that a data signal supplied from the data line may be supplied to the pixel electrode.

An integrated circuit 106 may supply the data signal and the scan signal. The integrated circuit 106 may be inserted into one side surface of the second substrate 104b. The surroundings of the integrated circuit 106 may be coated with a protective layer 108.

The first substrate 104a may be opposite to the second substrate 104b. A common electrode of transparent materials, e.g., ITO, IZO, etc., may be on a front surface of the first substrate 104a. The common electrode may be supplied with a predetermined voltage so that a predetermined electric field may be formed between the common electrode and the pixel electrode. An array angle of liquid crystal injected between the first substrate 104a and the second substrate 104b may be changed by the electric field, and an optical transmittance may be changed according to the changed array angle, thus displaying a desired image.

The backlight assembly 150 may include LEDs 112, a LED substrate 114, a light guide plate 118, and optical sheets 110.

The LEDs 112 may generate light having predetermined brightness via a driving signal supplied from the LED substrate 114.

The LED substrate 114 may supply driving signals to the LEDs 112 corresponding to an externally-supplied control signal.

The light guide plate 118 may supply light generated by the LEDs 112 to the LCD panel 104. The light guide plate 118 may supply light supplied from its side surface to the LCD panel 104 positioned at its upper part.

The optical sheets 110 may improve the brightness of the light, which may be supplied from the light guide plate 118, and may supply the light to the LCD panel 104.

The bottom chassis 122 may include a side surface part 124 flatly positioned at an outer side surface to surround four edges of an outer part of the bottom chassis 122. The bottom chassis 122 may also include an inner side part 126 formed to have a predetermined step from the side surface part 124, which may allow the insertion of the light guide plate 118 and the optical sheets 110.

The bottom chassis 122 may be indented so that an inner part of the bottom chassis has an indentation sufficient for insertion of one or more of the light guide plate 118, the optical sheets 110, and the LED substrate 114.

The inner side part 126 may have a predetermined step from the side surface part 124. The inner side part 126 may therefore have a predetermined height to define a space, into which may be inserted the light guide plate 118, the optical sheets 110, the LED substrate 114, and the LEDs 112.

The side surface part 124 may have a predetermined width so that the LCD panel 104 may be safely seated. The side surface part 124 may be formed to have a width wider than that of a post, i.e., a step, extending from the inner side part 126 to the side surface part 124.

The light guide plate 118 and the optical sheets 110 may be inserted into the inner side part 126 of the bottom chassis without employing a mold frame. Omitting the mold frame from the final display construction may make it possible to reduce the manufacturing cost. The bottom chassis 122 may be, e.g., aluminum, etc., which may impart strength higher than that of a conventional mold frame. The mold frame may therefore be omitted, which may also make it possible to produce a very slim LCD device.

The light incident from the light guide plate 118 to the inner side part 126 may be reflected from the inner side part 126, and may be then supplied back to the light guide plate 118. Since the bottom chassis may be, e.g., aluminum, which may be capable of reflecting light, a reflector (120 of FIG. 2) may be omitted. The strength of the bottom chassis 122 may be high (that is, high strength may be imparted by the side surface part 124 positioned at the four surfaces), which may make it possible to omit a top chassis (102 of FIG. 2).

Figure 2:
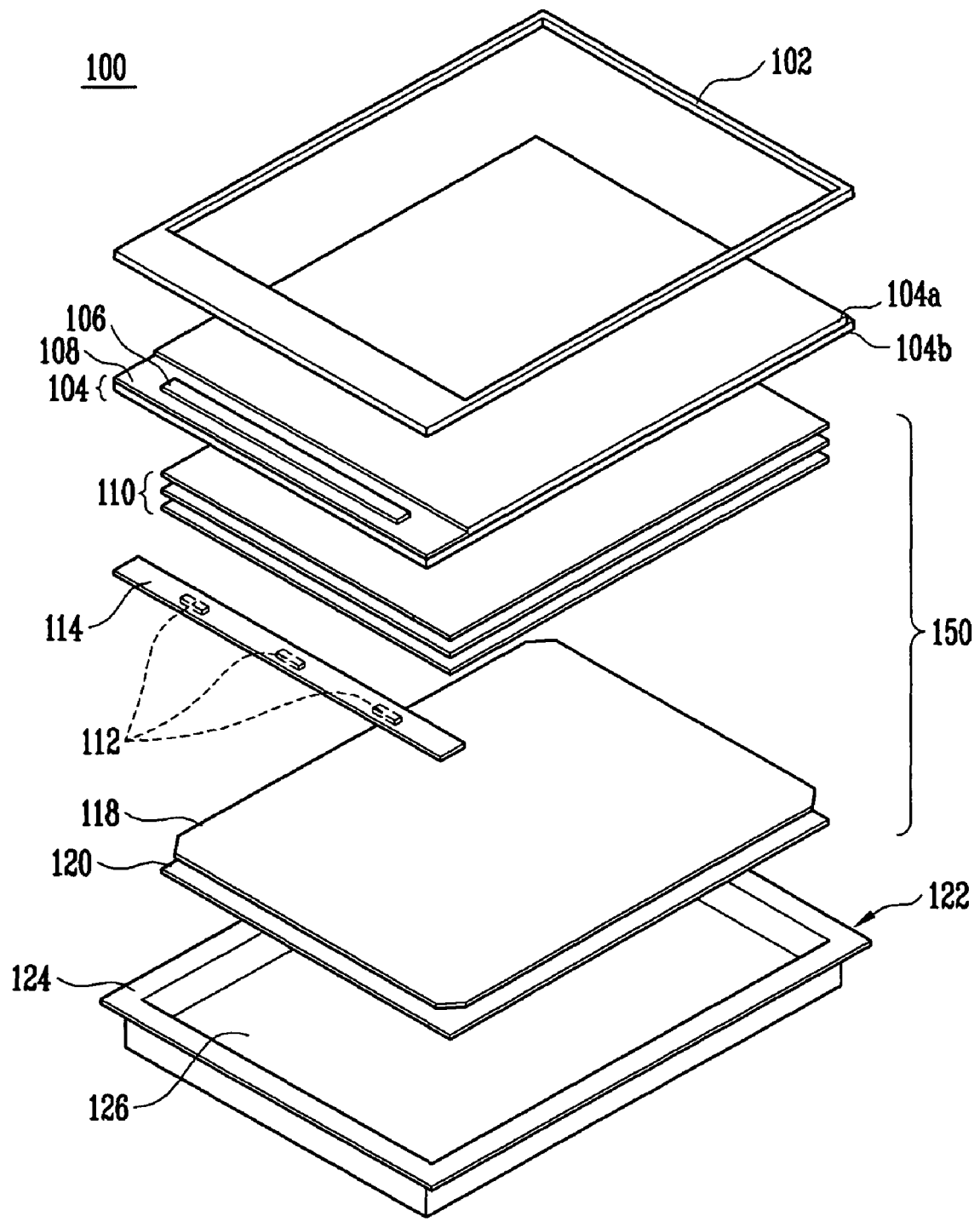
FIG. 2 illustrates an exploded perspective view where a reflector and a top chassis are added to the LCD device of FIG. 1.

Referring to FIG. 2, the reflector 120 and the top chassis 102 may be added or removed according to the requirements of the display. The reflector 120 may be between the light guide plate 118 and the bottom chassis 122, and the top chassis 102 may be on the LCD panel 104. The reflector 120 may improve light efficiency by reflecting the light supplied from the light guide plate 118 back to the light guide plate 118. The top chassis 102 may be fixed to the bottom chassis 122 to prevent movement of the LCD panel 104, as well as to impart strength.

Figure 3:
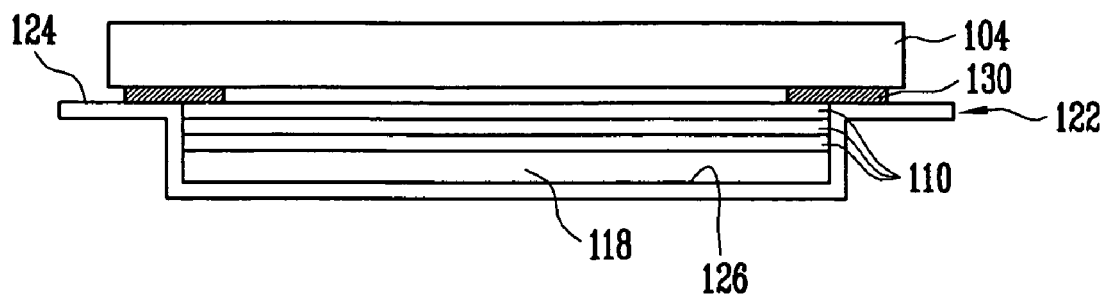
FIG. 3 illustrates a cross-sectional view of the LCD device taken along line IV-IV' of FIG. 1 when the LCD device is assembled.

FIG. 3 illustrates a cross-sectional view of the LCD device taken along line IV-IV' of FIG. 1 when the LCD device is assembled.

Referring to FIG. 3, the light guide plate 118 and the optical sheets 110 may be inserted into the inner side part 126 of the bottom chassis 122. A top surface of the optical sheets 110 may be substantially flush with a top surface of the side surface part 124. After the inner side part 126 is fitted with the light guide plate 118 and the optical sheets 110, an adhesive tape 130 may be attached to the side surface part 124. The adhesive tape 130 may be a double sided adhesive tape. The LCD panel 104 may be seated on the adhesive tape 130 so that the LCD panel 104 and the bottom chassis 122 may be stably fixed. The adhesive tape 130 may be replaced with an adhesive material, e.g., silicone, acrylate, epoxy, etc.

Figure 4:
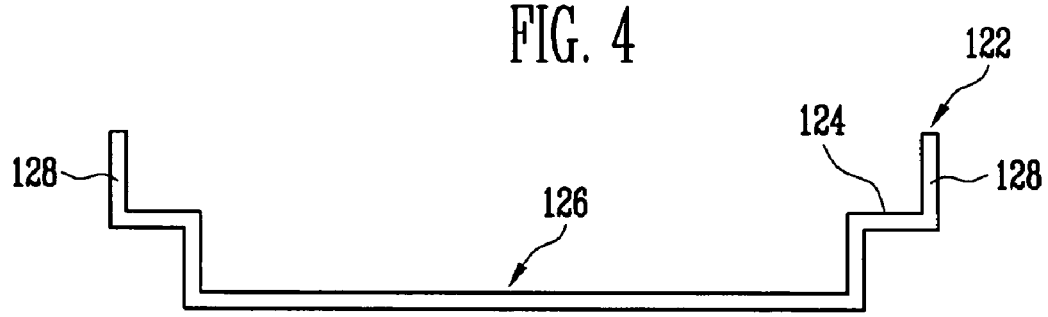
FIG. 4 illustrates a view of a projecting part extended from a bottom chassis shown in FIG. 1.
Figure 5:
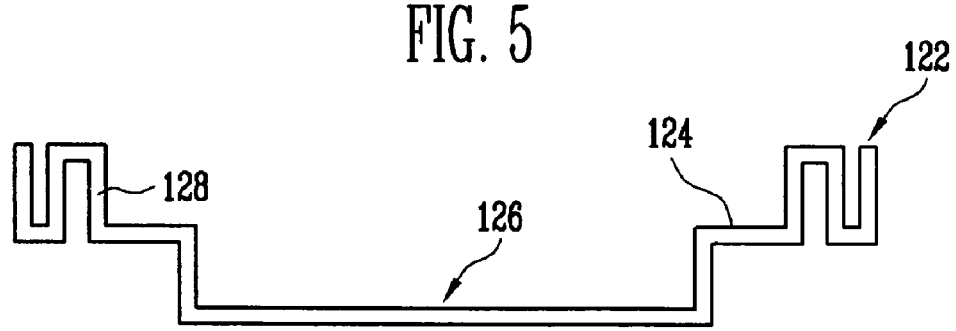
FIG. 5 illustrates a view where the projecting part of FIG. 4 is bent at least once.

Various components may be added in order to improve the strength of the bottom chassis 122. Referring to FIG. 4, a projecting part 128 may extend from an outer side of the side surface part 124 of the bottom chassis 122. When the bottom chassis 122 includes the projecting part 128, the strength of the bottom chassis 122 may be increased. When the bottom chassis 122 is formed with the projecting part 128, externally applied impacts may be mitigated by the projecting part 128 so that the LCD panel 104 therein may stably be protected. The projecting part 128 may be formed in various forms, e.g., at a substantially right angle from the side surface part 124. As shown in FIG. 5, the projecting part 128 may be extended at a substantially right angle from the side surface part 124, and may be formed to be bent back toward the outer side of the side surface part 124 at least once, which may make it possible to impart higher strength to the bottom chassis 122. The bends illustrated in FIG. 5, are substantially right angles, but other angles may be used.

Figure 6:
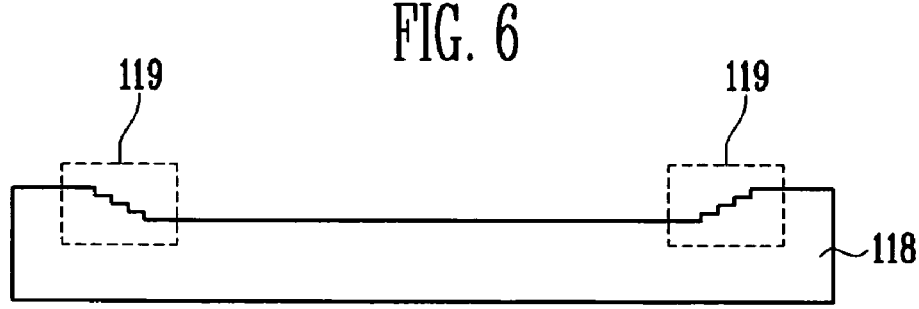
FIG. 6 illustrates a cross-sectional view of the light guide plate of FIG. 1.

FIG. 6 illustrates a view showing the light guide 118 plate of FIG. 1.

Referring to FIG. 6, the light guide plate 118 may have step parts 119 in multiple step form. The step parts 119 may have at least one step, which may be lowered a step proceeding from the outer side to the inner side of the light guide plate 118. The step parts 119 may prevent movement of the optical sheets 110 positioned on the light guide plate 118. When the optical sheets 110 are seated on the step parts 119, movement of the optical sheets may be prevented by the step parts 119 so that any degradation due to the movement of the optical sheets 110 may be prevented.

The step parts 119 may be opposite to each other on both side surfaces of the light guide plate 118. When the step parts 119 are opposite to each other on both sides of the outer side region of the light guide plate 118, movement of the optical sheets 110 may be prevented. The step parts 119 may be on all side surfaces of the light guide plate 118 in a quadrangular form, which may further prevent the movement of the optical sheets 110.

Figure 7:
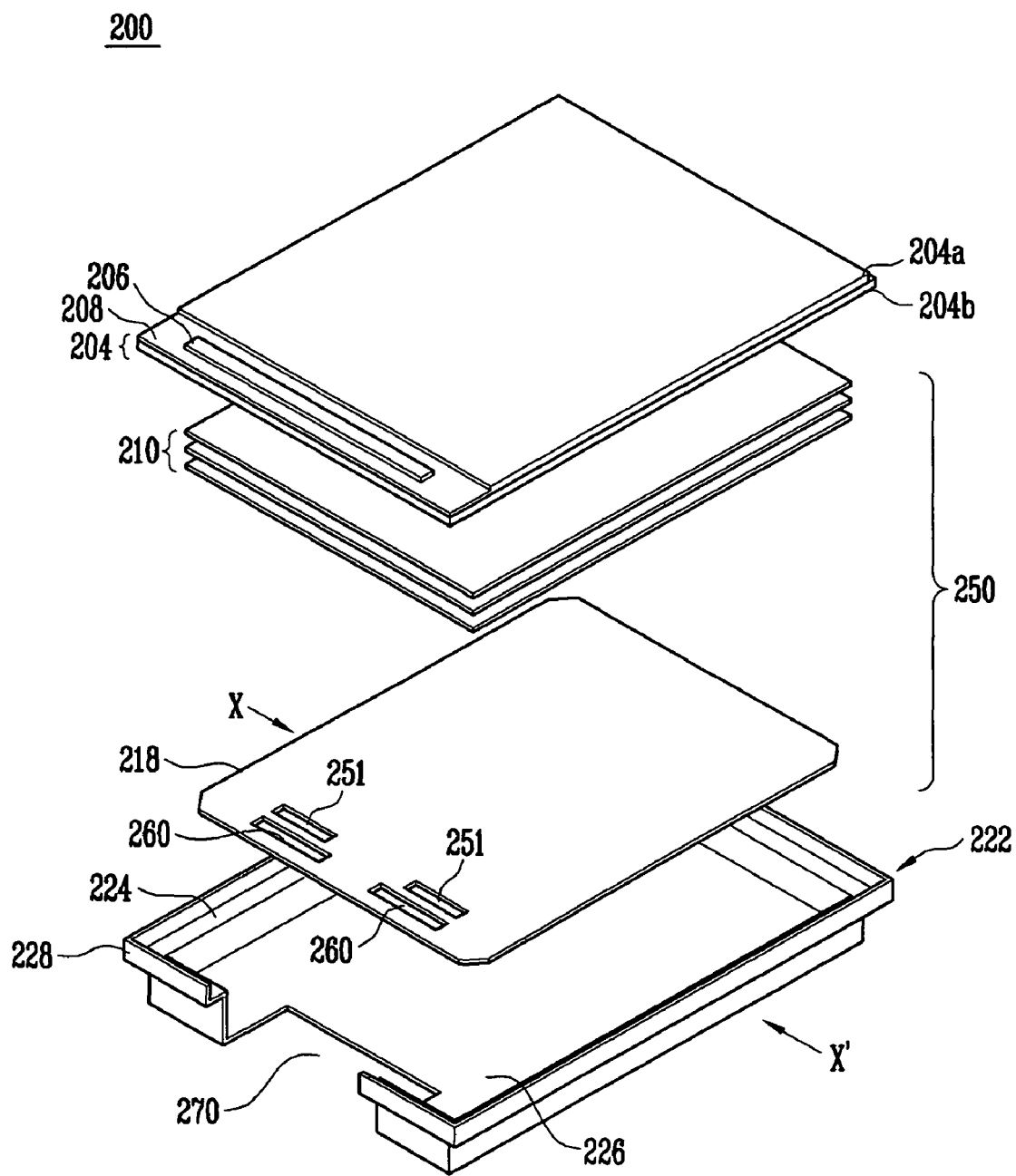
FIG. 7 illustrates an exploded perspective view of a LCD device according to a second embodiment.

FIG. 7 illustrates a view of a LCD device 200 according to a second embodiment.

Referring to FIG. 7, the LCD device 200 may include a LCD panel 204, a backlight assembly 250, and a bottom chassis 222.

The LCD panel 204 may display a predetermined image. The LCD panel 204 may include a first substrate 204a, a second substrate 204b, and a liquid crystal injected therebetween.

The second substrate 204b may include multiple TFTs (not shown) arranged in an array. The source electrode of each TFT may be connected to a data line, and the gate electrode of the TFT may be connected to a scan line. The drain electrode of the TFT may be connected to a pixel electrode composed of transparent conductive materials. The TFT may be turned-on when a scan signal is supplied to the scan line so that a data signal supplied from the data line may be supplied to the pixel electrode.

An integrated circuit 206 may be inserted into a side surface of the second substrate 204b. The integrated circuit 206 may supply the data signal and the scan signal. A protective layer 208 may be applied to the surroundings of the integrated circuit 206. The protective layer 208 may also cover the integrated circuit 206.

The first substrate 204a may be opposite to the second substrate 204b. A common electrode composed of transparent materials, e.g., ITO, IZO, etc., may be on a front surface of the first substrate 204a. The common electrode may be supplied with a predetermined voltage so that a predetermined electric field may be formed between the common electrode and the pixel electrode. An array angle of liquid crystal injected between the first substrate 204a and the second substrate 204b may be changed by the electric field, and an optical transmittance may be changed according to the changed array angle, which may thus display a desired image.

The backlight assembly 250 may include a light guide plate 218 and optical sheets 210.

The light guide plate 218 may supply the light emitted by the LEDs to the LCD panel 204. The light guide plate may include first holes 251 and second holes 260, where the first and second holes 251 and 260 may be on an outer side of one side surface of the light guide plate 218. LEDs may be inserted in the first holes 251. The LEDs in the first holes 251 may supply a predetermined amount of light to the light guide plate 218. A flexible printed circuit (FPC) (not shown) may be connected to the LEDs to supply driving signals to the LEDs. The FPC may be connected to the LEDs via the second holes 260. Components of the FPC may be inserted in the second holes 260.

The optical sheets 210 may improve the brightness of the light, which may be supplied from the light guide plate 218, and supply it to the LCD panel 204.

The bottom chassis 222 may be formed to accommodate the insertion of the light guide plate 218 and the optical sheets 210. The bottom chassis 222 may include a flatly positioned side surface part 224 around a perimeter of the bottom chassis, an inner side part 226 having a predetermined step from the side surface part 124, and a projecting part 228 extended from an outer side of the side surface part 224.

The inner side part 226 may be formed to have a predetermined step from the side surface part 224. The inner side part 226 may have a predetermined space, wherein the space may accommodate insertion of, e.g., the light guide plate 218 and the optical sheets 210.

The side surface part 224 may be positioned to surround all or part of four edges of the inner side part 226, which may impart strength to the bottom chassis 222. The projecting part 228 may be extended from the side surface part 224 to impart strength to the bottom chassis 222.

An opening part 270 may be formed in the bottom chassis 222 so as to overlap portions or all of the first holes 251 and the second holes 260. When the opening part 270 is positioned over portions of the first holes 251 and the second holes 260, the LEDs, the flexible printed circuit, etc., may be easily inserted.

The light guide plate 218 and the optical sheets 210 may be inserted in the inner side part 226 of the bottom chassis 222 so that a mold frame may be omitted, which may make it possible to reduce the manufacturing cost. The bottom chassis 222 may be aluminum, etc., which may make it possible to impart higher strength.

The bottom chassis 222 may be composed of, e.g., reflective aluminum, so that a reflector 220 (see FIG. 8) between the light guide plate 218 and the inner side part 226 may be removed. The light supplied from the light guide plate 218 may be reflected from the inner side part 226 so that the reflector 220 may be omitted. Since higher strength may be imparted to the bottom chassis 222, a top chassis 202 (see FIG. 8) may be omitted.

Figure 8:
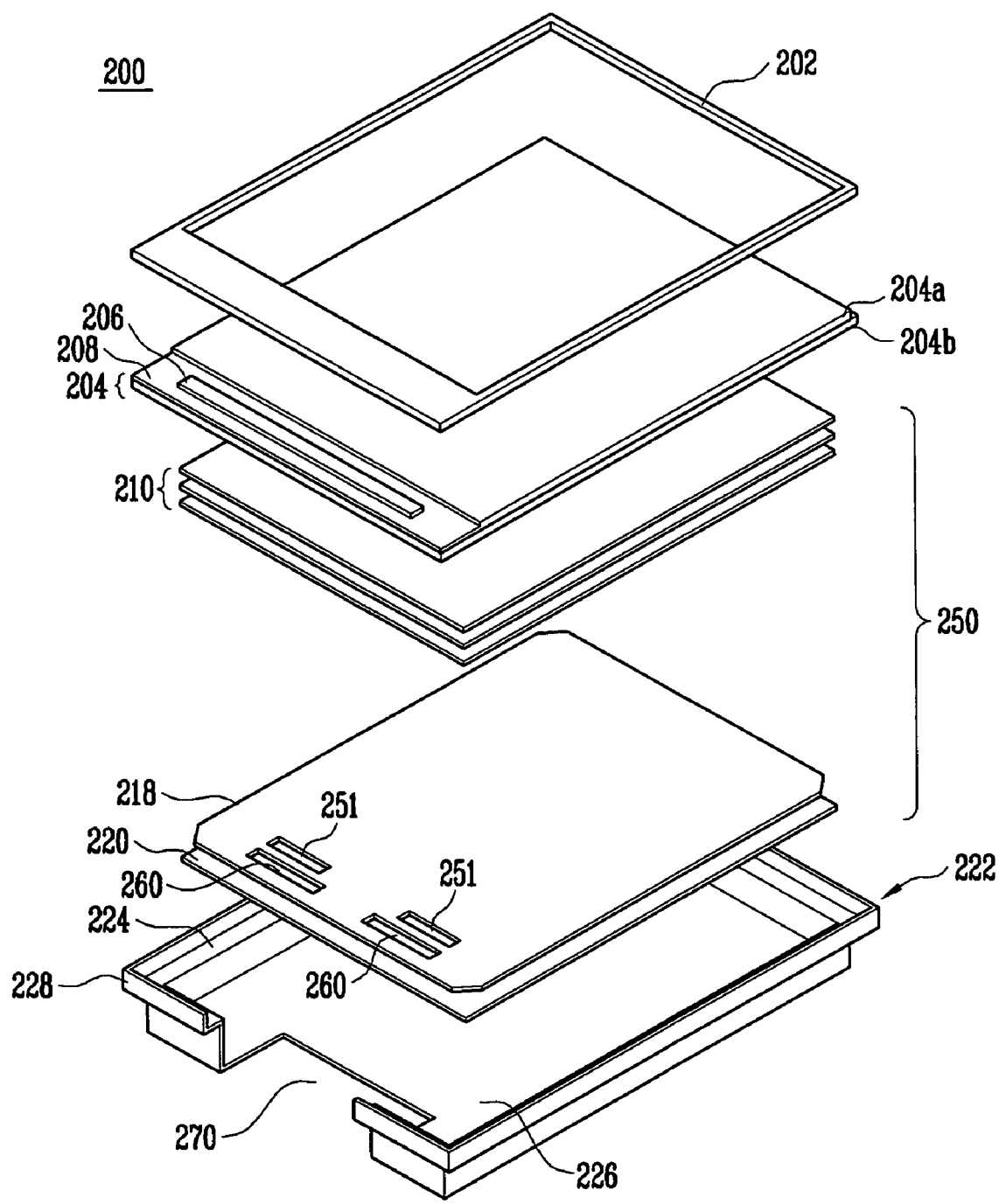
FIG. 8 illustrates an exploded perspective view where a reflector and a top chassis are added to the LCD device of FIG. 7.

Referring to FIG. 8, the reflector 220 and the top chassis 202 may be added or omitted in accordance with the characteristic of the display. The reflector 220 between the light guide plate 218 and the bottom chassis 222 may be added, and the top chassis 202 may be on the LCD panel 104. The reflector 220 may improve light efficiency by reflecting light back to the light guide plate 218. The top chassis 202 may be fixed to the bottom chassis 222 to prevent the movement of the LCD panel 204 as well as to impart predetermined strength.

Figure 9:
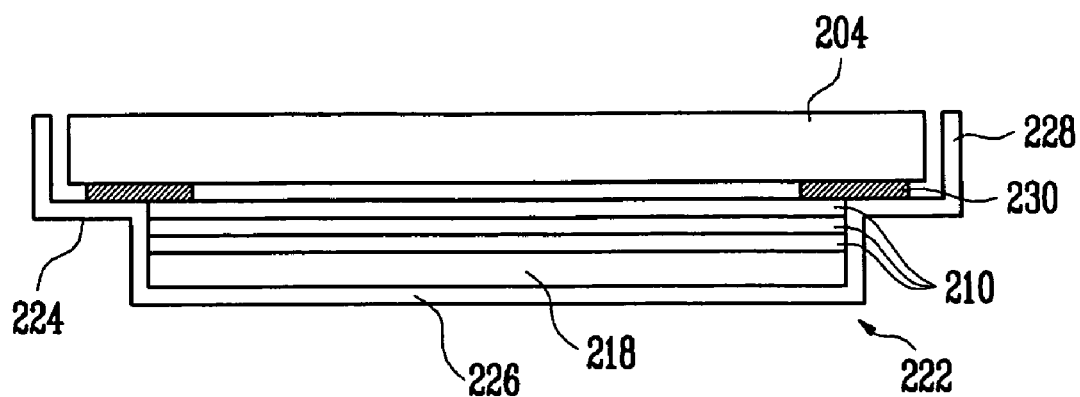
FIG. 9 illustrates a cross-sectional view of the LCD device taken along line X-X' of FIG. 7 when the LCD device is assembled.

FIG. 9 illustrates a cross-sectional view showing the LCD device taken along line X-X' of FIG. 8 when the LCD device of FIG. 8 is assembled.

Referring to FIG. 9, the light guide plate 218 and the optical sheets 210 may be inserted into the inner side part 226 of the bottom chassis 222. After the light guide plate 218 and the optical sheets 210 are inserted into the inner side part 226, an adhesive tape 230 may be attached to the side surface part 224. The adhesive tape 230 may be a double sided adhesive tape. The LCD panel 204 may be seated on the adhesive tape 230 so that the LCD panel 204 and the bottom chassis 222 are stably fixed. The adhesive tape 230 may be replaced with an adhesive material, e.g., silicone, acrylate, epoxy, etc.

The projecting part 228 may be extended at a substantially right angle from the side surface part 224, and may be formed to be bent toward the outer side of the side surface part 224 at least once (similar to the configuration illustrated in FIG. 5), which may make it possible to impart higher strength to the bottom chassis 222. The projecting part 228 may be omitted from the bottom chassis 222.

Figure 10:
FIG. 10 illustrates a cross-sectional view of the light guide plate of FIG. 7.

FIG. 10 illustrates a view of the light guide plate 218 shown in FIG. 7.

Referring to FIG. 10, the light guide plate 218 may be formed with step parts 219. The step parts 219 may each have at least one step, which may be lowered in step form proceeding from the outer side to the inner side of the light guide plate 218. Two, three, four or more steps may also be used. The step parts 219 may prevent the movement of the optical sheets 210 on the light guide plate 218. When the optical sheets 210 are seated in the step parts 219, movement of the optical sheets 210 may be prevented by the step parts 219 so that any degradation due to movement of the optical sheets 210 may be prevented.

The step parts 219 may be opposite to each other on both side surfaces of the light guide plate 218. When the step parts 219 are formed to be opposite to each other on both sides of the outer side region of the light guide plate 218, the movement of the optical sheets 210 may be prevented to result in a stable construction. The step parts 219 may be on all side surfaces of the light guide plate 218 in a quadrangular form, which may further prevent the movement of the optical sheets 210. The light guide plate 218 may be configured to accommodate the first holes 251 and the second holes 260.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display device, comprising:
    a display panel;
    at least one optical sheet under the display panel;
    a light guide plate on the at least one optical sheet;
    a bottom chassis having a side surface part on which the display panel is seated, and an inner side part having at least one step from the side surface part, the at least one optical sheet and the light guide plate being in the inner side part, the bottom chassis including a metal frame;
    a projecting part extending from an outer side of the side surface part; and
    light emitting diodes on a light emitting diode substrate, the light emitting diode substrate being in the inner side part of the bottom chassis, wherein:
    a first portion of the projecting part extends at a substantially right angle from the side surface part, a side surface of the display panel overlaps the first portion of the projecting part, and
    a second portion of the projecting part is bent back toward the outer side of the side surface part, the side surface of the display panel overlaps the second portion of the projecting part.

2. The display device as claimed in claim 1, wherein a portion of the display panel that overlaps the side surface part is fixed to the side surface part by an adhesive material.

3. The display device as claimed in claim 2, wherein the adhesive material is an adhesive tape that is coupled with the display panel and the side surface part.

4. The display device as claimed in claim 1, further including a reflector between the inner side part and the light guide plate.

5. The display device as claimed in claim 1, further including a top chassis on the display panel, the top chassis being fixed to the bottom chassis.

6. The display device as claimed in claim 1, wherein the light guide plate includes:
    first holes adapted to accommodate light emitting diodes; and
    second holes adapted to accommodate components of a flexible printed circuit.

7. The display device as claimed in claim 6, wherein the bottom chassis includes
    an opening part over the first holes and the second holes.

8. The display device as claimed in claim 1, wherein:
    an outer side of the light guide plate has at least one step part proceeding from the outer side to an inner side of the light guide plate, and
    at least one optical sheet is seated on at least one step part.

9. The display device as claimed in claim 8, wherein the step parts are opposite to each other on two sides of the light guide plate.

10. The display device as claimed in claim 8, wherein the step parts are on all side surfaces of the light guide plate in a quadrangular form.

11. The display device as claimed in claim 8, wherein a portion of the display panel that overlaps the side surface part is fixed to the side surface part by an adhesive material.

12. The display device as claimed in claim 11, wherein the adhesive material is an adhesive tape that is coupled with the display panel and the side surface part.

13. The display device as claimed in claim 8, further including a reflector between the inner side part and the light guide plate.

14. The display device as claimed in claim 8, further including a top chassis on the display panel, the top chassis being fixed to the bottom chassis.

15. The display device as claimed in claim 8, wherein the light guide plate includes:
    first holes adapted to accommodate light emitting diodes; and
    second holes adapted to accommodate components of a flexible printed circuit.

16. The display device as claimed in claim 15, wherein the bottom chassis includes an opening over the first holes and the second holes.

17. The display device as claimed in claim 1, wherein:
    the second portion of the projecting part is bent back toward the outer side of the side surface part in a first direction, and
    a third portion of the projecting part is bent in a second direction, the second direction being different from the first direction, the side surface of the display panel overlapping the third portion of the projecting part, and the second portion of the projecting part being between the first and third portions of the projecting part.

18. The display device as claimed in claim 17, wherein the second portion of the projecting part is bent back in the first direction such that the side surface of the display panel overlaps the second portion and the light guide plate in the inner side part of the bottom chassis does not overlap the second portion.

19. The display device as claimed in claim 18, wherein the third portion of the projecting part is bent in the second direction such that the light guide plate in the inner side part of the bottom chassis does not overlap the third portion.

20. The display device as claimed in claim 17, wherein the first direction is opposite the second direction.

* * * * *